(12) United States Patent
Mizuno et al.

(10) Patent No.: US 8,530,779 B2
(45) Date of Patent: Sep. 10, 2013

(54) DISC SPRING AND PROCESS OF MANUFACTURING THE SAME

(75) Inventors: Eiji Mizuno, Nagoya (JP); Yuichi Hirata, Nagoya (JP)

(73) Assignee: Chuo Hatsujo Kabushiki Kaisha, Nagoya-Shi (JP)

( * ) Notice: Subject to any disclaimer, the term of this patent is extended or adjusted under 35 U.S.C. 154(b) by 651 days.

(21) Appl. No.: 12/833,603

(22) Filed: Jul. 9, 2010

(65) Prior Publication Data
US 2011/0006467 A1   Jan. 13, 2011

(30) Foreign Application Priority Data

Jul. 13, 2009  (JP) .................. 2009-164605

(51) Int. Cl.
*B23K 15/00* (2006.01)
*F16F 1/34* (2006.01)

(52) U.S. Cl.
USPC ........... 219/121.14; 267/158; 148/524

(58) Field of Classification Search
USPC .............. 219/121.14; 148/524, 525, 714, 148/908; 267/158, 161
See application file for complete search history.

(56) References Cited

U.S. PATENT DOCUMENTS

| | | | |
|---|---|---|---|
| 5,495,837 | A | 3/1996 | Mitsuhashi et al. |
| 6,779,564 | B2 | 8/2004 | Hasegawa et al. |
| 6,836,964 | B2 | 1/2005 | Hasegawa et al. |
| 7,699,943 | B2 | 4/2010 | Nakano et al. |

FOREIGN PATENT DOCUMENTS

| | | | |
|---|---|---|---|
| JP | S58-053390 | | 3/1983 |
| JP | 60100642 A | * | 6/1985 |
| JP | H01-202390 | | 8/1989 |
| JP | 03226546 A | * | 10/1991 |
| JP | 6-106277 | | 4/1994 |
| JP | H07-229412 | | 8/1995 |
| JP | 8-135706 | | 5/1996 |
| JP | H09-155588 | | 6/1997 |
| JP | 2001-225112 | | 8/2001 |
| JP | 2003-329072 | | 11/2003 |
| JP | 2004-202499 | | 7/2004 |

OTHER PUBLICATIONS

Office Action mailed Jun. 4, 2013 from the Japanese Patent Office for counterpart (priority) JP application No. 2009-164605, including English translation thereof.

* cited by examiner

*Primary Examiner* — Samuel M Heinrich
(74) *Attorney, Agent, or Firm* — J-TEK Law PLLC; Jeffrey D. Tekanic

(57) ABSTRACT

A metal strip 10 is bent to form a ring and end parts 12 and 14 are connected to each other. An electron beam 26 may be defocused and emitted to a welded section 20 along a crosswise direction of the metal strip 10. Next, a focal point 28 of the electron beam 26 may be focused onto a weld-melted portion 25 to execute electron beam welding. Subsequently, the electron beam 26 may be defocused emitted to the welded section 20 along the crosswise direction of the metal strip 10, and the welded section 20 may be further cooled. The average of the dendrite secondary arm spacing of the weld-melted portion may fall within a range of 7 to 30 μm.

15 Claims, 7 Drawing Sheets

Disc Spring 2

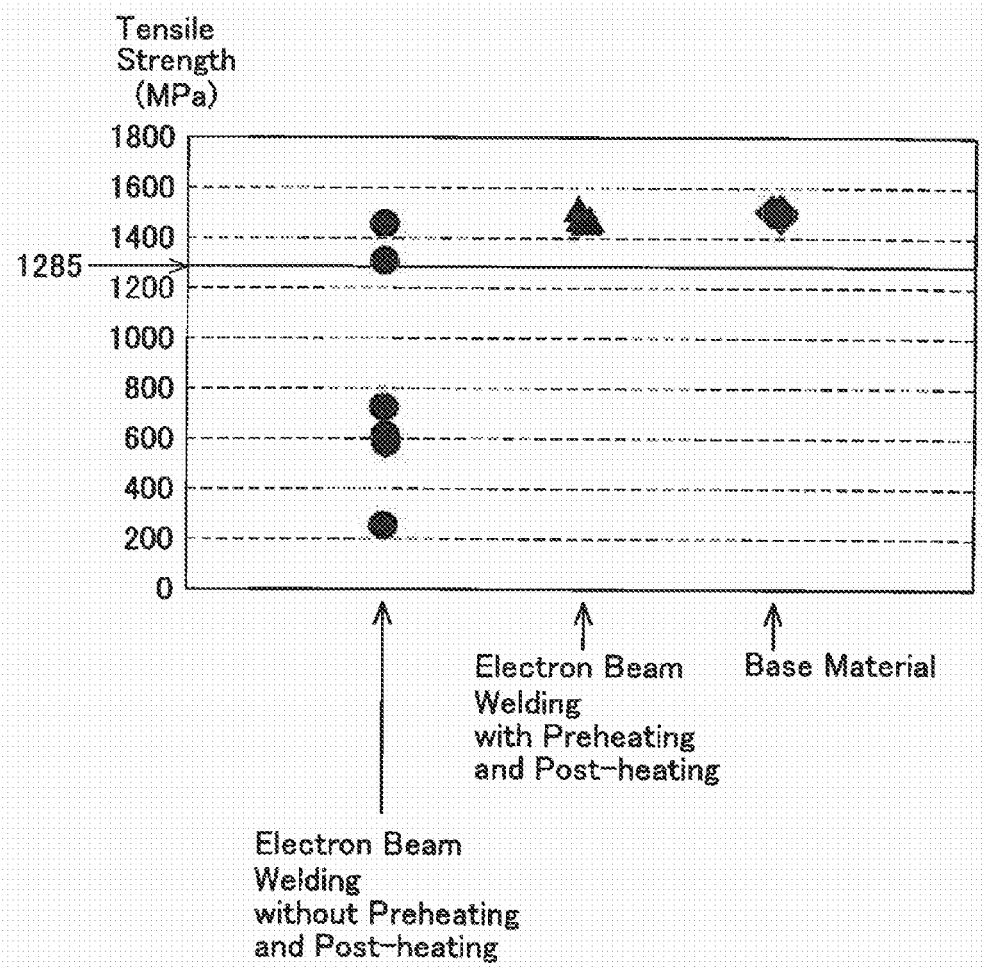

DISC SPRING AND PROCESS OF MANUFACTURING THE SAME

CROSS-REFERENCE TO RELATED APPLICATIONS

This application claims priority to Japanese Patent Application No. 2009-164605, filed on Jul. 13, 2009, the contents of which are hereby incorporated by reference into the present application.

TECHNICAL FIELD

The present invention relates to a disc spring and a process of its manufacture. The term "disc spring" here means a general spring in the shape of a ring. The term "disc spring" here includes a spring plate, ring-shaped spring, and diaphragm spring.

DESCRIPTION OF THE RELATED ART

As the process of manufacture of the disc spring, there is known a method for punching out a steel flat plate using a stamping machine to form a ring (referred to as "punching method" hereinafter). The punching method, however, produces much waste from the flat plate, lowering material yield. For this reason, a method for manufacturing a disc spring with a good material yield has been developed (JP H06-106277A). This manufacturing method bends a steel metal strip to form a ring shape, connects both ends of the metal strip by welding, and forms a truncated cone shape.

SUMMARY

In general, steel used for a disc spring (e.g., high-carbon steel, medium-carbon steel, special steel, etc.) cracks easily at the time of the welding. When the inventors of the present application manufactured a disc spring by the manufacturing method described in the abovementioned patent literature, cracks had occurred at the welded section with a high probability. The inventors had found that, even when no cracks were generated at the welded section, the joint strength on the welded section was weak, and that the disc spring did not have fatigue resistance, tensile strength and other performances required in the disc spring. Therefore, the conventional technology described above has not been put to practical use because the quality of the disc spring used as a product cannot be ensured.

The present specification provides, based on the technology for manufacturing a disc spring out of a metal strip, a technology that is capable of preventing the occurrence of cracks at the welded section and manufacturing a disc spring having a satisfying quality as a product.

After reviewing the causes of the cracks generated in the welded section, the inventors have found that hardening of the welded section resulted from the quick heating and cooling thereof at the time of the welding had caused the cracks. The inventors, therefore, have discovered a method for manufacturing a disc spring having a satisfying quality as a product, in which no cracks are generated at the welded section by controlling the temperature profile at the time of the welding. It should be noted that "controlling the temperature profile at the time of the welding" means to control the changes in the temperature of the welded section from prior to a welding step to a cooling step.

One aspect of techniques disclosed in the present specification is a method for producing a disc spring. The method may comprise a step of: bending a metal strip to form a ring shape; connecting both ends of the metal strip by using an electron beam welding; and cooling a weld-melted portion of the metal strip formed by the electron beam welding. A temperature profile of the weld-melted portion is controlled in the step of cooling the weld-melted portion such that an average of a secondary dendrite arm spacing of solidification structure in the weld-melted portion is within a range from 7 μm to 30 μm.

According to this configuration, the both ends of the ring-shaped metal strip are connected to each other by the electron beam welding. The weld-melted portion that is generated by the electron beam welding is cooled such that the average of a secondary dendrite arm spacing (which may hereinafter be abbreviated as DAS II) of solidification structure in the weld-melted portion falls within a range from 7 μm to 30 μm. In other words, the weld-melted portion is cooled slowly. In this manner, the occurrence of cracks in the weld-melted portion can be prevented, and a disc spring having a satisfying quality as a product can be obtained.

The step of cooling the weld-melted portion may include a post-heating step of heating at least the weld-melted portion of the ring-shaped metal strip that is performed subsequent to the step of connecting. A temperature of the post-heating step may be lower than a temperature that causes the ring-shaped metal strip to melt.

The post-heating step may be performed by defocusing an electron beam. A portion of the ring-shaped metal strip including the weld-melted portion may be heated in the post-heating step.

The portion of the ring-shaped metal strip including the weld-melted portion may be annealed in the post-heating step.

The method may include a preheating step of heating at least both the ends of the ring-shaped metal strip that is performed prior to the step of connecting. A temperature of the preheating step may be lower than a temperature that causes the ring-shaped metal strip to melt.

The preheating step may be performed by defocusing the electron beam. A portion of the ring-shaped metal strip including both the ends of the ring-shaped metal may be heated in the preheating step.

The electron beam may be oscillated in the step of connecting in accordance with shapes of the both ends of the metal strip.

The present specification may further provide "a disc spring in which both ends of a ring-shaped metal strip are welded to each other," which has a satisfying quality as a product. In this disc spring, the average of the DAS II of the solidification structure in the weld-melted portion falls within the range from 7 μm to 30 μm. Note that the term "weld-melted portion" means a section in the welded section in which the both ends of the metal strip are melted and connected to each other. Because the average of the DAS II of the weld-melted portion is between 7 μm and 30 μm, this disc spring can have a satisfying quality as a product while preventing the occurrence of cracks.

BRIEF DESCRIPTION OF THE DRAWINGS

FIG. 10 shows the results of a tensile strength test.

DETAILED DESCRIPTION OF THE PREFERRED EMBODIMENTS

Figure 1:
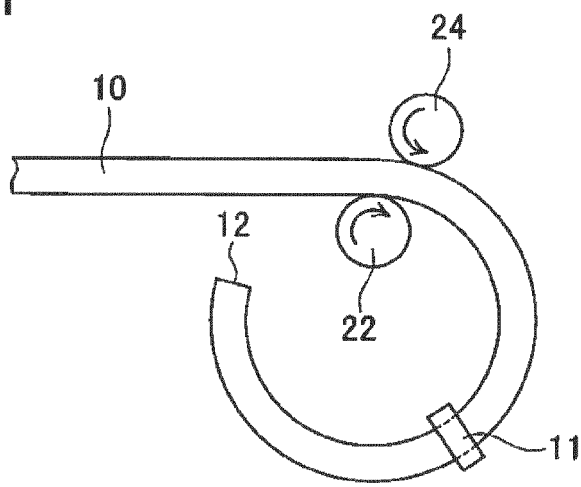
FIG. 1 shows a method for manufacturing a disc spring of an embodiment.
Figure 1:
Figure 1:
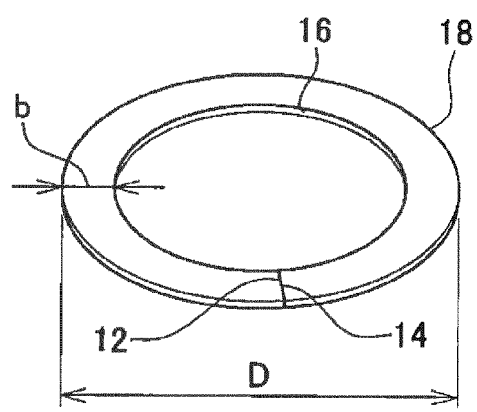
Figure 1:
Figure 1:
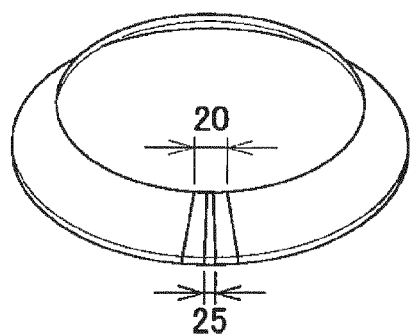

The method for manufacturing a disc spring disclosed in the present embodiment will be described using FIGS. 1 and 2. A metal strip 10 shown in FIG. 1 is a shaped base material of a disc spring. For example, Japanese Industrial Standards SK85(SK5), SK85M(SK5M), SWRH82A or other known steel materials can be used as the metal strip 10. A long, flat base steel material is rolled. In order to manufacture the disc spring, a forming step using a forming device, a welding step using a welding device, and a press forming step using a pressing device are executed. Each of these steps is described hereinafter.

(Forming Step)

As shown in FIG. 1, the forming device has rollers 22, 24. The rollers 22, 24 rotate independently from each other, in the directions of the arrows shown in the diagram. Other than these rollers 22, 24, the forming device is provided with a plurality of rollers that are not shown in the diagram. A bending guide 11 is disposed downstream of the rollers 22, 24. The bending guide 11 is tilted at a predetermined angle. Furthermore, a cutter, not shown, is disposed in the vicinity at a downstream of the bending guide 11.

The metal strip 10 is fed to the bending guide 11 as the rollers 22, 24 rotate. Because the bending guide 11 is tilted at the predetermined angle, the metal strip 10 fed to the bending guide 11 is subjected to a bending process. As a result, the metal strip 10 is formed into a ring. As shown in FIG. 1, one of side surfaces in a lengthwise direction of the metal strip 10 forms an outer circumferential rim 18 by being formed into a ring. The other side surface in the lengthwise direction of the metal strip 10 forms an inner circumferential rim 16 by being formed into a ring. The predetermined angle mentioned above is determined based on a diameter desired in a spring product.

When the metal strip 10 is fed a predetermined length and passes through the bending guide 11, the metal strip 10 is cut by the cutter disposed in the forming device. The cut surface of the metal strip 10 obtained here is shown as an end part 14 in FIG. 1. Next, an end part 12 and the end part 14 are made to meet each other. The predetermined length mentioned above is determined based on the diameter desired in the spring product, as with the case of the predetermined angle. Note that the outer diameter of the member formed into a ring is expressed as "D" and the width of the disc spring as "b." It is preferred that D/b≧8 be satisfied. When D/b is less than 8, it becomes difficult to form the metal strip 10 into a ring.

Moreover, the shapes of the end parts 12 and 14 are not limited to those shown in FIG. 1, as long as the both ends are formed into shapes that can be joined to each other. For example, end surfaces of the end parts 12 and 14 may have asperities, inclinations, or curves that allow the both ends to match. In the case where the shape of a weld-melted portion is complicated, even when the weld-melted portion cracks as a result of deterioration thereof associated with the use of the disc spring, the progression of cracking can be slowed down until breaking occurs, because a welding distance is made longer than that of a simple linear shape. In addition, the end part 12 and the end part 14 may not lie in the same plane and may partially overlap with each other. This is because the both end parts can be integrated by electron beam welding, even when the both end parts overlap with each other. Also, even when the welded section is swollen by welding the overlapping parts, the welded section can be flattened when a deburring step described hereinafter is performed.

(Welding Step)

The welding step of welding the both ends of the metal strip 10 will be described using FIG. 2. As shown in FIG. 2, an electron beam welding device of the present embodiment can emit an electron beam 26 to the welded section of the metal strip 10. At this juncture, the welded section is not yet welded. However, the term "welded section" includes the state of the section not yet welded, as well as the state of the section after having been welded. The metal strip 10 can be melted and welded by focusing the electron beam 26 onto the prospective welded section. On the other hand, the metal strip 10 can be heated without melting, by defocusing the electron beam 26. The electron beam 26 not only can freely oscillate in the lengthwise direction or a crosswise direction of the metal strip 10, but also can rotate or slide in relation to the metal strip 10. A known electron beam welding device can be used as the electron beam welding device in the present embodiment. Note that, in order to weld the metal strip 10, arc welding or spot welding can alternately be carried out in place of the electron beam welding. The electron beam welding does not produce oxidation of the welded section because the electron beam welding is performed in a vacuum. Because the energy density of the beam is extremely high, the heat generated from the welding process affects an extremely narrow section. Therefore, welding can be performed with little thermal strain. Moreover, preheating and post-heating of the welded section using the electron beam can be carried out easily and instantaneously, as described hereinafter, by controlling the defocusing and oscillation operations of the electron beam.

Figure 2:
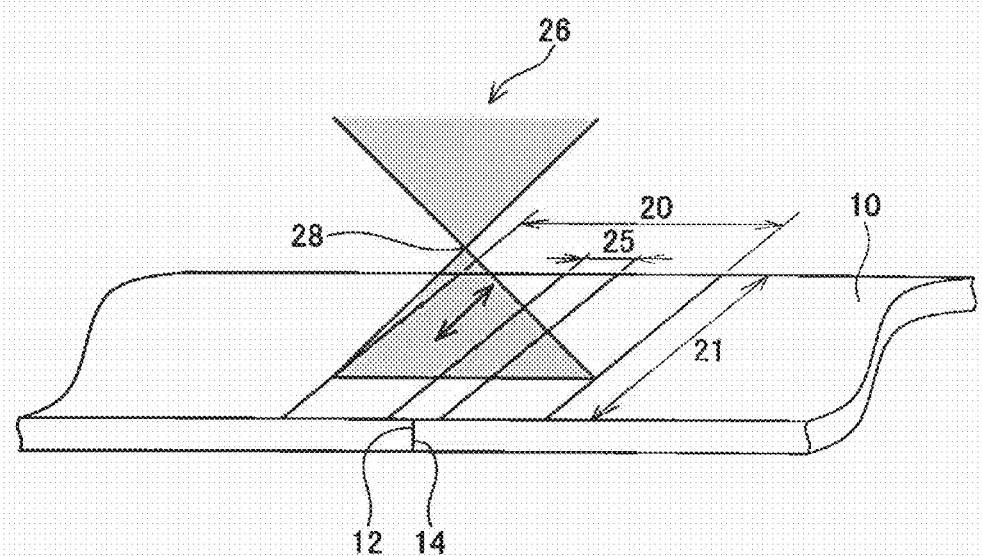
FIG. 2 shows a diagram illustrating how a welded section is preheated and post-heated by an electron beam.

In order to perform the welding by using the abovementioned welding device, as shown in FIG. 2, first, the metal strip 10 formed into a ring is fixed while the end part 12 and the end part 14 of the metal strip 10 are made to meet each other, and the position of a welded section 20 (at this juncture, a section that is to be the welded section 20) is adjusted so that the electron beam 26 is emitted thereto. Before welding the both ends of the metal strip 10 to each other, the welded section 20 is preheated. By preheating the welded section 20, the metal strip 10 can be prevented from being heated drastically, and the joint strength of the welding can be increased.

In the present embodiment, a preheating process described next is executed. In the preheating process, the electron beam 26 is emitted to the welded section 20 while keeping a focal point 28 of the electron beam 26 defocused from the metal strip 10. Further, the electron beam 26 is emitted to the welded section 20 while oscillating the electron beam 26 in the lengthwise direction of the metal strip 10 and sliding the electron beam 26 in the crosswise direction of the metal strip 10. As a result, the entire welded section 20 is preheated, with a weld-melted portion 25 (specifically, a portion which will become the weld-melted portion in a later step) of the metal strip 10 at the center. In the preheating process, the welded section 20 may not be heated to the point of melting. It is preferred that the preheating be performed such that the temperature of an area in the vicinity of the weld-melted portion 25 becomes approximately 400° C. For example, when using the SK85 as the metal strip 10 in which a width 21 in the crosswise direction of the metal strip 10 is 13.5 mm and the thickness is 2.7 mm, and when the electron beam 26 is emitted to approximately 10 mm of an area to be preheated (which will become the welded section 20) at a certain beam output (e.g., a current value is 20 mA and a voltage value is 60 kV) for an emitting time of approximately 1.5 seconds, the temperature of the area in the vicinity of the weld-melted portion 25 becomes 400° C. The preheating process is performed prior to the actual welding. In the present embodiment, the preheating process is performed in succession to the below-described electron beam welding process, however, the preheating process may be performed at other timing prior to the electron beam welding process.

Next, the focal point 28 of the electron beam 26 is focused onto the weld-melted portion 25 of the metal strip 10 to execute the electron beam welding. Consequently, the steel material of the weld-melted portion 25 thereby melts and the end parts 12 and 14 of the metal strip 10 are joined to each other. The temperature of weld-melted portion 25 is higher than 400° C. Welding conditions for the electron beam welding can be set appropriately according to the size of the disc spring and the type of the steel material. For example, in the case described above (i.e., when using the SK85 as the metal strip 10 in which the width 21 in the crosswise direction of the metal strip 10 is 13.5 mm and the thickness is 2.7 mm), the emitting time during which the electron beam 26 is emitted is set at approximately 1 second, the beam output (i.e., the current value is 25 mA and the voltage value is 60 kV) and the emission width 0.2 mm, and the width of the weld-melted portion 25 approximately 2 mm. It is preferred that the electron beam welding be executed immediately after the preheating step. This is because the temperature profile of the welded section 20 can be managed easily.

Next, the post-heating step is preferably executed in the cooling step. By post-heating the welded section 20, the cooling velocity for cooling the weld-melted portion 25 can be lowered. As a result, the joint strength of the welding can be increased. The post-heating process is performed after the actual welding. In the present embodiment, the post-heating process is performed in succession from the above-described electron beam welding process, however, the post-heating process may be performed at other timing after the electron beam welding process.

In the present embodiment, a post-heating process described hereinafter is executed. In the post-heating process, the electron beam 26 is emitted to the welded section 20, while keeping the focal point 28 defocused from the metal strip 10. Further, the electron beam 26 is emitted to the welded section 20 while oscillating the electron beam 26 in the lengthwise direction of the metal strip 10 and sliding the same in the crosswise direction of the metal strip 10. As a result, the entire welded section 20 is post-heated, with the weld-melted portion 25 of the metal strip 10 at the center. It is preferred that the post-heating be performed such that the temperature of the welded section 20 becomes approximately 600° C. For example, in the case described above (i.e., when using the SK85 as the metal strip 10 in which the width 21 of the crosswise direction of the metal strip 10 is 13.5 mm and the thickness is 2.7 mm), when the electron beam 26 is emitted to approximately 10 mm of a heated area (the welded section 20) at a certain beam output (i.e., the current value is 15 mA and the voltage value is 60 kV) for an emitting time of approximately 1.5 seconds, the temperature of the welded section 20 becomes 600° C. It is preferred that the post-heating step be executed immediately after the welding. This is because the temperature profile of the welded section 20 can be managed easily. The welded section is heated to a higher temperature in the post-heating step than in the preheating step. By the temperature of post-heating is higher than preheating, the cooling velocity for cooling the weld-melted portion 25 can be lowered. As a result, the joint strength of the welding can be increased.

In the subsequent cooling step, the welded section 20 is air-cooled. Generally, the cooling velocity in an air-cooling operation is approximately 10 K/sec. Note that the cooling step is not limited to the aforesaid example, and may alternately be performed by means of a known cooling device or furnace cooling, in substitute of the air-cooling, or a combination of the aforesaid means, as long as the temperature profile can be managed. Note that a heating process after welding, such as an annealing process, may be carried out in order to eliminate internal distortion (internal strain) resulted from work hardening. This heating process after welding may be performed after the actual welding process and before or during the cooling process. Moreover, the deburring step for removing burrs caused by the welding step may additionally be executed after or during the cooling step. A known trimming process can be used as the deburring step.

(Press Forming Step)

Next, a pressing device is used for press-forming the metal strip 10 having the end parts welded to each other. The pressing device has a molding die with a molding surface in the shape of a conical cylinder. A tapering surface that has a slope at a predetermined angle is formed on a die surface of the molding die. Note that a known pressing machine can be used as the pressing device. A pressing device that is used in a punching method can also be used. The metal strip 10 is set on the molding die, and then the pressing device forms the conical-cylindrical tapering surface on the metal strip 10 by applying a predetermined pressure to the metal strip 10. As a result, a disc spring 2 in a truncated cone shape is obtained, as shown in FIG. 1.

The method for manufacturing the disc spring 2 of the present embodiment has described in detail. In the manufacturing method according to the present embodiment, not only is it possible to prevent the weld-melted portion 25 from being heated and cooled drastically, but also the occurrence of cracks at the time of the welding can be prevented, by executing the preheating step and the post-heating step before and after the welding. In the case where the electron beam welding is actually carried out without performing preheating and post-heating (comparative example), cracks were observed at four out of ten points in the welded section 20 of the disc spring. However, in the disc spring manufactured by the manufacturing method according to the present embodiment, no visible cracks were generated at all ten points. Therefore, with the method for manufacturing a disc spring by welding the both ends of the metal strip 10, it was confirmed that the disc spring 2 could be manufactured without causing any cracks, by preheating and post-heating the welded section 20 before and after the welding. Thus, unlike the punching method, the manufacturing method according to the present embodiment can manufacture a disc spring with a good material yield. Next, the characteristics of the disc spring 2 manufactured in the present embodiment will be described hereinafter with reference to the drawings.

Figure 3:
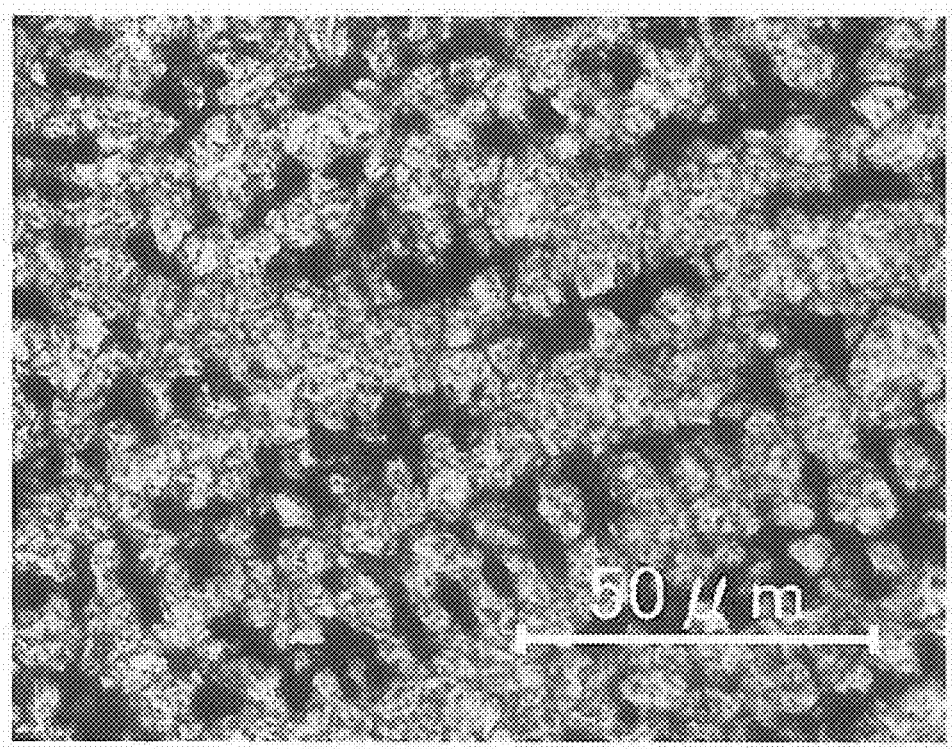
FIG. 3 shows a magnified picture of a weld-melted portion.
Figure 4:
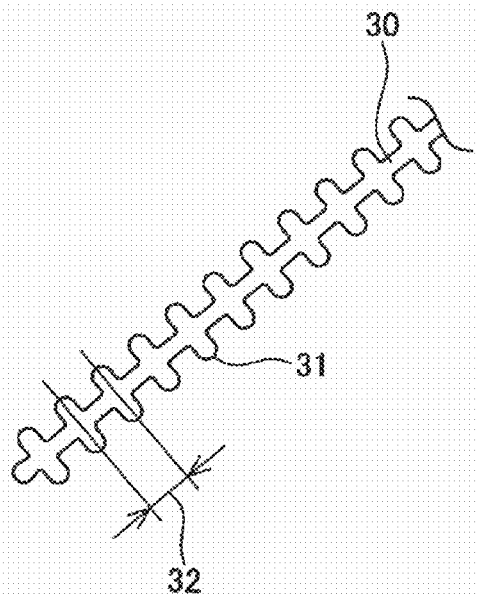
FIG. 4 schematically shows a DAS II of the weld-melted portion.

FIG. 3 shows a magnified picture of the weld-melted portion 25 of the disc spring 2 manufactured in the present embodiment. As shown in FIG. 3, a dendrite crystal that is precipitated as a result of the cooling step after the electron beam welding is observed in the weld-melted portion 25. The scale bar shown in FIG. 3 shows 50 μm. FIG. 4 schematically shows the shape of the dendrite crystal shown in FIG. 3. The dendrite crystal splits from a primary branch 30 into secondary branches 31. Generally, a distance 32 between the secondary branches 31 is called "dendrite secondary arm spacing" ("DAS II" hereinafter). The value of the DAS II is known to correlate with the cooling velocity. A relational expression between the DAS II and the cooling velocity is expressed as DAS II=$aV^{-0.3}$. The "a" in the above expression is a constant determined by according to alloy, and "DAS II" is inversely proportionate to the 0.3 power of the cooling velocity. For example, when the cooling velocity is high, the DAS II becomes a small value. When the cooling velocity is low, the DAS II becomes a large value. Thus, because the DAS II depends on the cooling velocity, the DAS II varies significantly between welding where preheating and post-heating are performed and welding where preheating and post-heating are not performed. The correlation between preheating and post-heating performed in the present embodiment and DAS II is explained hereinafter using the drawings.

Figure 5:
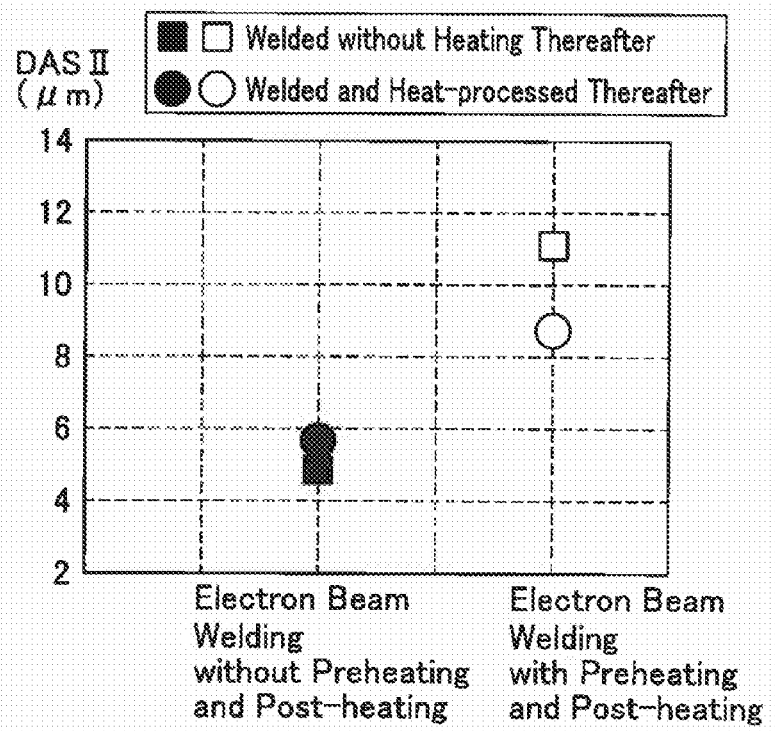
FIG. 5 shows changes of DAS II between welding with preheating and post-heating and welding without preheating and post-heating.

FIG. 5 illustrates a distribution of the DAS II (μm) of the metal strip 10 obtained by performing the electron beam welding of the present embodiment and then cooling (the white square □ and circle ○ in the diagram) and that of the metal strip 10 obtained by performing the electron beam welding and then cooling without carrying out the preheating and post-heating processes (the black square ■ and circle ● in the diagram). The vertical axis represents the DAS II (μm). When the electron beam welding is performed without performing the preheating and post-heating processes, the DAS II is approximately 5 μm (the black square ■ in the diagram). When the heating process after welding such as an annealing process is performed after the cooling, the DAS II becomes approximately 6 μm (the black circle ● in the diagram). On the other hand, when the electron beam welding according to the present embodiment (i.e., the electron beam welding preceded by the preheating and succeeded by the post-heating) is performed, the DAS II is approximately 11 μm (the white square □ in the diagram). In addition, when the heating process after welding such as an annealing process is further performed, the DAS II is approximately 8 μm (the white circle ○ in the diagram). Thus, an empirical border value between the DAS II obtained by simply performing the electron beam welding of the present embodiment and the DAS II obtained by performing the electron beam welding without carrying out the preheating and post-heating processes was substantially 7 μm.

Figure 6:
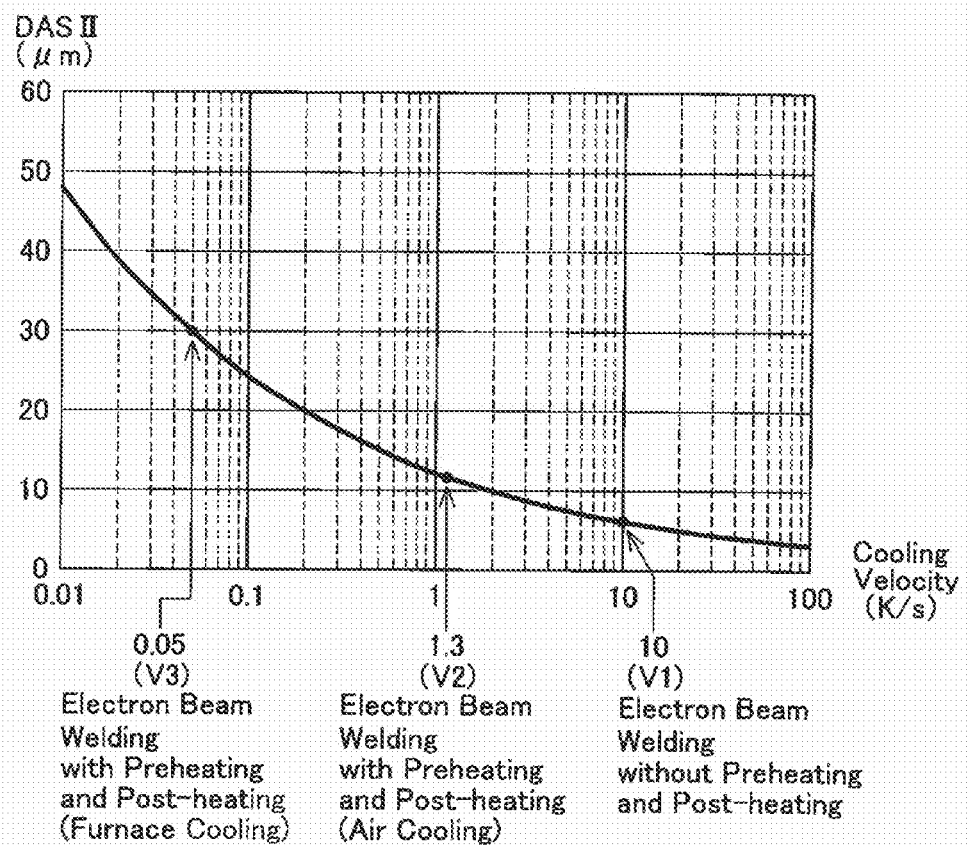
FIG. 6 shows the relationship between cooling velocities and changes of the DAS II.

Next, FIG. 6 is used to explain hereinafter the relationship of the DAS II obtained by simply performing the electron beam welding of the present embodiment and the DAS II obtained by performing the electron beam welding without performing the preheating and post-heating processes, to the cooling velocity. The vertical axis of FIG. 6 represents the DAS II, and the horizontal axis represents the cooling velocity. As shown in the diagram, the cooling velocity V2 was 1.3 K/sec when the electron beam welding according to the present embodiment (including the preheating and post-heating processes) was performed. The cooling velocity V1 was 10 K/sec when the electron beam welding was performed without carrying out the preheating and post-heating processes. Therefore, it can be said that the cooling velocity V2 of the present embodiment and the cooling velocity V1 of the comparative example are clearly different by one digit order.

Although the DAS II increases by lowering the cooling velocity, deflective strength decreases when the cooling velocity is too low. Therefore, it is preferred in the cooling step that the cooling be performed at the cooling velocity that is not lower than the cooling velocity used in furnace cooling (which is much lower than the cooling velocity used in air-cooling). FIG. 6 shows the DAS II obtained when the furnace cooling is performed after the electron beam welding is executed. As is clear from the diagram, the cooling velocity V3 in the furnace cooling is 0.05 K/sec, and the DAS II is 30 μm. For this reason, it is preferred to carry out the cooling such that the DAS II becomes equal to or lower than 30 μm. That is, either the furnace cooling or the air-cooling may be utilized as desired for the processing product.

Figure 7:
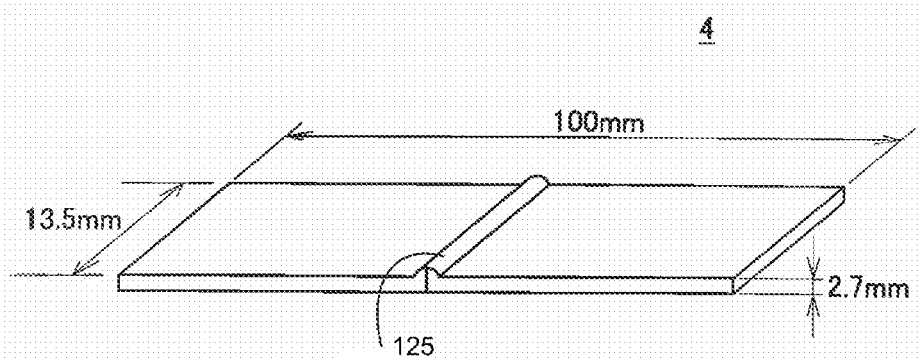
FIG. 7 shows a test piece that is used in a mechanical characteristic test of electron beam welding for manufacturing the disc spring of the present embodiment.
Figure 8:
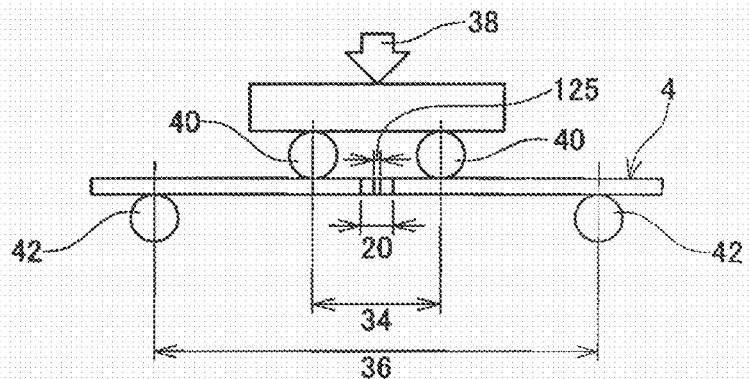
FIG. 8 shows a method of four-point bending fatigue testing.

Next, the mechanical characteristics of the joint portion joined by the electron beam welding according to the present embodiment will be described using FIGS. 7 to 10. FIG. 7 shows a test piece 4 used for examining the mechanical characteristics of the joint portion. The test piece 4 is obtained by joining end parts of two plate materials to each other by the electron beam welding. The length in the lengthwise direction is 100 mm, the length in the crosswise direction 13.5 mm, and the thickness of the metal strip is 2.7 mm. A joint portion (i.e., weld-melted portion) 125 is formed across the crosswise direction in substantially a middle position in the lengthwise direction of the test piece 4. FIG. 8 is a schematic diagram of a four-point bending fatigue test. The test piece 4 is mounted on mount shafts 42 such that the weld-melted portion 125 of the test piece 4 is disposed at the center of an intrashaft space 36 between the mount shafts 42, and pressurizing shafts 40 are placed on this test piece 4. Furthermore, the weld-melted portion 125 of the test piece 4 is disposed at the center of an intrashaft space 34 between the pressurizing shafts 40. A predetermined load 38 is repeatedly applied to the pressurizing shafts 40 until breaking occurs at or in the vicinity of the weld-melted portion 125. In this manner, fatigue strength of the spring material is measured.

Figure 9:
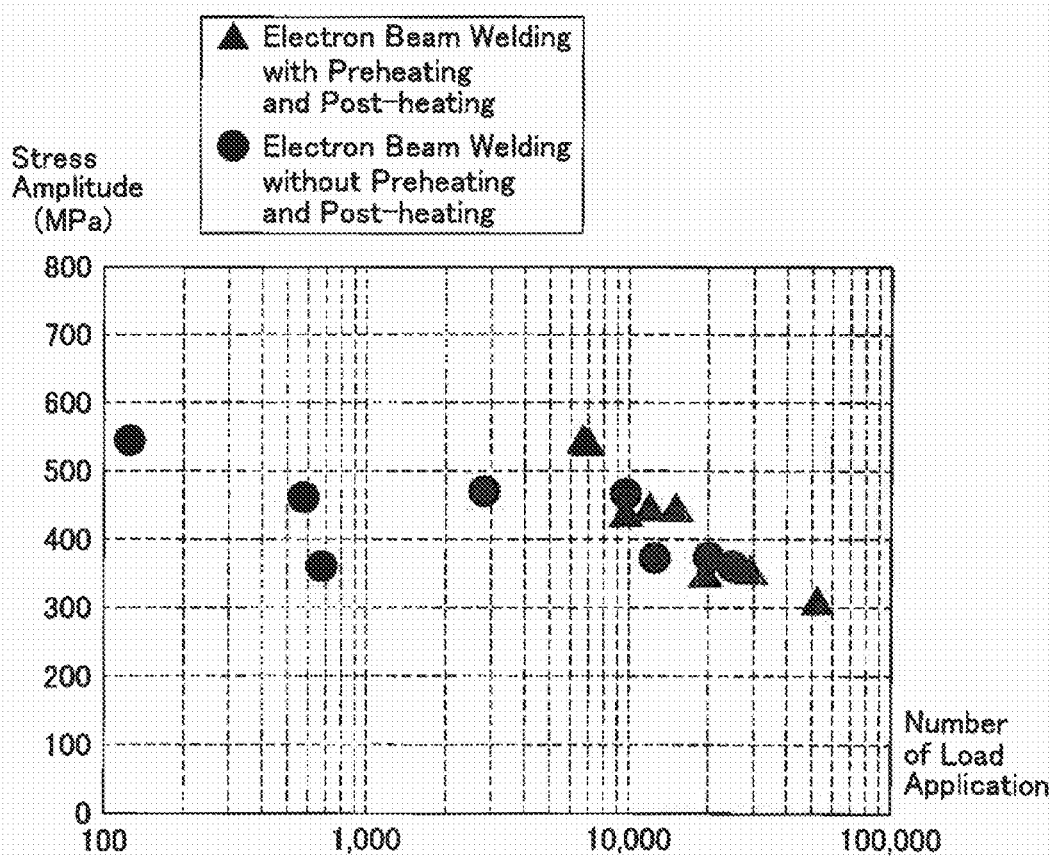
FIG. 9 shows the results of the four-point bending fatigue testing.

FIG. 9 shows the results of the bending fatigue test shown in FIG. 8. The vertical axis represents a stress amplitude (MPa) representing the predetermined load 38, and the horizontal axis represents the number of times the load was repeatedly applied until breaking occurred at or in the vicinity of the weld-melted portion 125 (in logarithmic scale). It indicates that larger number of load application leads to higher fatigue strength of the spring material. The bending fatigue testing was performed on first test pieces that are manufactured by performing the electron beam welding according to the present embodiment, as well as on second test pieces that are manufactured by the electron beam welding without performing the preheating and post-heating processes. For each of the first and second test pieces, eight samples were subjected to the test. Further, for each of the eight samples, different stress amplitude ranging within 300 MPa to 550 MPa was applied.

As a result of the bending fatigue test, for the second test pieces, the number of times the load was repeatedly applied has fluctuated significantly between 100 to 30,000 with respect to the stress amplitude between 300 and 550 MPa. There was no correlation between the value of the stress amplitude and the number of times the load was repeatedly applied. The four samples of the second test pieces positioned where the number of times the load was repeatedly applied is 100 to 3,000 are considered to have had early breakage that had started when cracks were generated at the time of the welding. This means that a satisfying fatigue resistance cannot be obtained when these test pieces are used as products. For the first test pieces of the present embodiment, the number of times the load was repeatedly applied was approximately 7000 with the stress amplitude of 550 MPa. The number of times the load was repeatedly applied was 50,000 with the stress amplitude of 300 MPa. In the first test pieces of the present embodiment, the number of times the load was repeatedly applied is localized at 6000 or more, meaning that a satisfying fatigue resistance can be obtained when these test pieces are used as products. In addition, in the first test pieces of the present embodiment, an inversely proportional linear correlation was obtained between the stress amplitude and the number of times the load was repeatedly applied. Therefore, compared to the second test pieces, the fluctuation of the fatigue strength of the spring material of the first test pieces can be reduced.

Next, a tensile test was performed in order to measure the joint strength of the weld-melted portion 125. FIG. 10 shows the results of the tensile test performed on a plurality of types of test pieces 4 of a disc spring material. First test pieces are manufactured by electron beam welding of the present embodiment, second test pieces are manufactured by electron beam welding without performing the preheating and post-heating processes, and third test pieces are unprocessed base steel material which does not have the welded part. The vertical axis represents the tensile strength (MPa) showing tensile load applied until each of the test pieces 4 is broken. The tensile test was performed on four samples of the first test piece of the present embodiment, six samples of the second test piece, and four samples of the third test piece. The joint strength of the samples of the first and second test pieces was measured, and the tensile strength of the samples of the third test piece was measured.

As a result of the tensile test, the joint strength of the second test pieces 4 has fluctuated between 200 to 1450 MPa. On the other hand, the joint strength of the first test pieces of the present embodiment was concentrated on 1400 to 1500 MPa, meaning that the joint strength has fluctuated less, compared to the second test pieces. The tensile strength of the base material (i.e., third test pieces 4) was approximately 1500 MPa. The joint strength of the first test pieces is equal to the tensile strength of the base material. Therefore, in terms of the tensile stress, it is highly unlikely that breaking occurs due to the weld-melted portion 125 manufactured according to the present embodiment.

Moreover, a Vickers hardness HV, which is a product standard of a disc spring required in a vehicle and the like, is 400 to 500 (HV). When this HV is converted into the tensile strength, the converted value corresponds to approximately 1285 to 1700 MPa. Thus, the value of the joint strength needs to be at least 1285 MPa. As shown in FIG. 10, four out of six samples of the second test pieces 4 did not meet the standard, whereas all four samples of the first test pieces 4 of the present embodiment have satisfied the standard.

The characteristics of the disc spring 2 according to the present embodiment were described above. The method for manufacturing a disc spring according to the present embodiment can manufacture the disc spring 2 without causing any cracks in the weld-melted portion 25 of the metal strip 10. Furthermore, the quality of the disc spring 2 manufactured by the manufacturing method of the present embodiment can be stabilized, and the joint strength can be improved. In addition, the disc spring 2 manufactured in the present embodiment can meet the product standard of a disc spring required in a vehicle and the like. Therefore, a disc spring with stable quality and good material yield can be provided.

Other modifications will be described. In the above embodiment, the weld-melted portion 25 is formed at the center of the welded section 20, whose area is larger than that of the weld-melted portion 25. However, the area of the weld-melted portion 25 and the welded section 20 may be identical. Further, the post-heating process of heating the welded section 20 by the electron beam, and the heating process after the welding (annealing, etc.) are examples of "a post-heating step" as recited in the claims.

Finally, although the preferred embodiments have been described in detail, the present embodiments are for illustrative purpose only and are not restrictive. It is to be understood that various changes and modifications may be made without departing from the spirit or scope of the appended claims. In addition, the additional features and aspects disclosed herein may also be utilized singularly or in combination with the above aspects and features.

What is claimed is:

1. A method for producing a disc spring, the method comprising steps of:
   bending a metal strip to form a ring shape;
   connecting both ends of the metal strip by using an electron beam welding; and
   cooling a weld-melted portion of the metal strip formed by the electron beam welding; wherein
   a temperature profile of the weld-melted portion is controlled in the step of cooling the weld-melted portion such that an average of a secondary dendrite arm spacing of solidification structure in the weld-melted portion is within a range from 7 µm to 30 µm.

2. The method for producing the disc spring as in claim 1, wherein
   the step of cooling the weld-melted portion includes a post-heating step of heating at least the weld-melted portion of the ring-shaped metal strip that is performed subsequent to the step of connecting, and
   a temperature of the post-heating step is lower than a temperature that causes the ring-shaped metal strip to melt.

3. The method for producing the disc spring as in claim 2, wherein
   the post-heating step is performed by defocusing an electron beam, and
   a portion of the ring-shaped metal strip including the weld-melted portion is heated in the post-heating step.

4. The method for producing the disc spring as in claim 3, wherein
   the portion of the ring-shaped metal strip including the weld-melted portion is annealed in the post-heating step.

5. The method for producing the disc spring as in claim 4, further comprising a preheating step of heating at least both the ends of the ring-shaped metal strip that is performed prior to the step of connecting, wherein
   a temperature of the preheating step is lower than a temperature that causes the ring-shaped metal strip to melt.

6. The method for producing the disc spring as in claim 5, wherein
   the preheating step is performed by defocusing an electron beam, and
   a portion of the ring-shaped metal strip including both the ends of the ring-shaped metal is heated in the preheating step.

7. The method for producing the disc spring as in claim 6, wherein
   an electron beam is oscillated in the step of connecting in accordance with shapes of the both ends of the metal strip.

8. The method for producing the disc spring as in claim 1, further comprising a preheating step of heating at least both the ends of the ring-shaped metal strip that is performed prior to the step of connecting, wherein
   a temperature of the preheating step is lower than a temperature that causes the ring-shaped metal strip to melt.

9. The method for producing the disc spring as in claim 8, wherein
the preheating step is performed by defocusing an electron beam, and
a portion of the ring-shaped metal strip including both the ends of the ring-shaped metal is heated in the preheating step.

10. The method for producing the disc spring as in claim 1, wherein
an electron beam is oscillated in the step of connecting in accordance with shapes of the both ends of the metal strip.

11. A method for producing a disc spring, the method comprising steps of:
bending a metal strip to form a ring shape;
preheating at least both the ends of the ring-shaped metal strip;
connecting both ends of the pre-heated metal strip by using an electron beam welding; and
cooling a weld-melted portion of the metal strip formed by the electron beam welding; wherein
a temperature profile of the weld-melted portion is controlled in the step of cooling the weld-melted portion such that an average of a secondary dendrite arm spacing of solidification structure in the weld-melted portion is within a range from 7 μm to 30 μm.

12. The method for producing the disc spring as in claim 11, wherein
the step of cooling the weld-melted portion includes a post-heating step of heating at least the weld-melted portion of the ring-shaped metal strip that is performed subsequent to the step of connecting.

13. The method for producing the disc spring as in claim 12, wherein
a temperature of the preheating step is lower than a temperature that causes the ring-shaped metal strip to melt, and
a temperature of the post-heating step is lower than a temperature that causes the ring-shaped metal strip to melt.

14. The method for producing the disc spring as in claim 13, wherein
the temperature of the preheating step is lower than the temperature of the post-heating step.

15. A disc spring comprising:
a ring-shaped body having a weld-melted portion at which both ends of a metal strip have been welded, wherein
an average of a secondary dendrite arm spacing of solidification structure in the welding-melt portion is within a range from 7 μm to 30 μm.

* * * * *